(12) United States Patent
Lamb, Jr. et al.

(10) Patent No.: US 9,234,460 B2
(45) Date of Patent: Jan. 12, 2016

(54) ENGINE INLET

(75) Inventors: Donald William Lamb, Jr., North Haven, CT (US); Joseph Lawrence Simonetti, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 305 days.

(21) Appl. No.: 13/477,376

(22) Filed: May 22, 2012

(65) Prior Publication Data

US 2013/0313371 A1 Nov. 28, 2013

(51) Int. Cl.
*B64D 33/02* (2006.01)
*F02C 7/04* (2006.01)

(52) U.S. Cl.
CPC . *F02C 7/04* (2013.01); *B64D 33/02* (2013.01); *B64D 2033/0246* (2013.01); *F05D 2260/606* (2013.01)

(58) Field of Classification Search
CPC ............................... B64D 33/02; B64D 27/26
USPC ............................................. 244/53 B, 53 R
See application file for complete search history.

(56) References Cited

U.S. PATENT DOCUMENTS

| | | | |
|---|---|---|---|
| 2,721,715 A | 10/1955 | Hoadley | |
| 3,275,270 A * | 9/1966 | Earl et al. | 244/110 E |
| 4,456,458 A * | 6/1984 | Gilbertson | 55/306 |
| 4,938,021 A * | 7/1990 | Jones et al. | 60/263 |
| 4,972,672 A | 11/1990 | Sanderson et al. | |
| 4,979,363 A * | 12/1990 | Hitchcock et al. | 60/226.3 |
| 4,989,807 A | 2/1991 | Foreman et al. | |
| 5,357,742 A * | 10/1994 | Miller | 60/785 |
| 5,447,283 A | 9/1995 | Tindell | |
| 5,662,292 A | 9/1997 | Greene et al. | |
| 5,779,169 A * | 7/1998 | Sloan | 244/12.3 |
| 6,616,094 B2 * | 9/2003 | Illingworth | 244/12.1 |
| 6,990,798 B2 * | 1/2006 | Bouchard et al. | 60/269 |
| 7,721,989 B2 | 5/2010 | Dyer et al. | |
| 2003/0132342 A1 | 7/2003 | Koncsek et al. | |
| 2005/0229605 A1 | 10/2005 | Bouchard et al. | |

FOREIGN PATENT DOCUMENTS

EP 2133265 A1 12/2009

OTHER PUBLICATIONS

Notification of Transmittal of the International Search Report and the Written Opinion of the International Searching Authority, or the Declaration; PCT/US2013/042195; Sep. 4, 2013.

* cited by examiner

*Primary Examiner* — Brian M O'Hara
*Assistant Examiner* — Keith L Dixon
(74) *Attorney, Agent, or Firm* — Cantor Colburn LLP

(57) ABSTRACT

An inlet duct for an engine or multiple engines includes two or more joining duct legs and a pressure relief pathway located at each duct leg to condition inlet airflow from the duct legs. A method of operating an aircraft includes urging an inlet airflow into two or more duct openings disposed at a fuselage of the aircraft. The inlet airflow is urged through two or more converging inlet duct legs extending from the two or more duct openings toward an engine inlet. A portion of the inlet airflow is flowed from at least one inlet duct leg of the two or more inlet duct legs into a pressure relief pathway. An inlet duct for an engine or multiple engines includes one or more inlet duct legs and a bypass leg extending from an inlet duct leg of the one or more inlet duct legs through a bypass opening.

20 Claims, 5 Drawing Sheets

ENGINE INLET

BACKGROUND OF THE INVENTION

The subject matter disclosed herein relates to aircraft. More specifically, the subject disclosure relates to inlet ducts for aircraft engines. Engines in some aircraft, for example, helicopters, are positioned such that there is an inlet duct opening at each lateral side of the airframe. Inlet airflow to the engine enters the inlet duct openings and travels down a bifurcated, or split, inlet duct before reaching the engine inlet. Such a configuration often results in significant pressure and flow distortion at yaw angles of the aircraft. Ram pressure effects on the inlet duct side facing freestream air increases the pressure in that leg of the bifurcated duct, while the pressure in the leg of the bifurcated duct in the "flow shadow", or partially obscured by the airframe, is significantly less, resulting in engine inlet distortion adversely affecting engine performance.

Further, some aircraft require reverse flight operations which also results in significant engine inlet pressure and flow distortion when utilizing the typical bifurcated inlet duct.

BRIEF DESCRIPTION OF THE INVENTION

According to one aspect of the invention, an inlet duct for an engine, or multiple engines, includes two or more inlet duct legs and a flow relief pathway located at each inlet duct leg to balance airflow from the inlet duct legs to reduce distortion at the engine interface.

According to another aspect of the invention, an inlet duct for an engine or multiple engines includes or more inlet duct legs and a bypass leg extending from an inlet duct leg of the one or more inlet duct legs through a bypass opening.

According to another aspect of the invention, an aircraft includes a fuselage and an engine located in the fuselage. Two or more duct openings are located at the fuselage and an inlet duct extends from the two or more duct openings to the engine. The inlet duct includes two or more converging inlet duct legs and a flow relief pathway located at each inlet duct leg to equalize a pressure distribution of an inlet flow from the inlet duct legs at the convergence.

According to another aspect of the invention, an aircraft includes a fuselage and one or more engines located in the fuselage. One or more duct openings are located at the fuselage and an inlet duct extends from the one or more duct openings to the engine. The inlet duct includes one or more inlet duct legs and a bypass leg extending from an inlet duct leg of the one or more inlet duct legs through a bypass opening.

According to yet another aspect of the invention, a method of operating an aircraft includes urging an inlet airflow into two or more duct openings disposed at a fuselage of the aircraft. The inlet airflow is urged through two or more converging inlet duct legs extending from the two or more duct openings toward an engine inlet. A portion of the inlet airflow is flowed from at least one inlet duct leg of the two or more inlet duct legs into a flow relief pathway.

According to yet another aspect of the invention. a method of operating an aircraft includes urging an inlet airflow into one or more duct openings disposed at a fuselage of the aircraft. The inlet airflow is urged through one or more inlet duct legs extending from the one or more duct openings toward an engine inlet. A portion of the inlet airflow is flowed from the one or more inlet duct legs through a bypass leg extending from the one or more inlet duct legs, and the portion of inlet airflow is flowed through a bypass opening in the fuselage.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
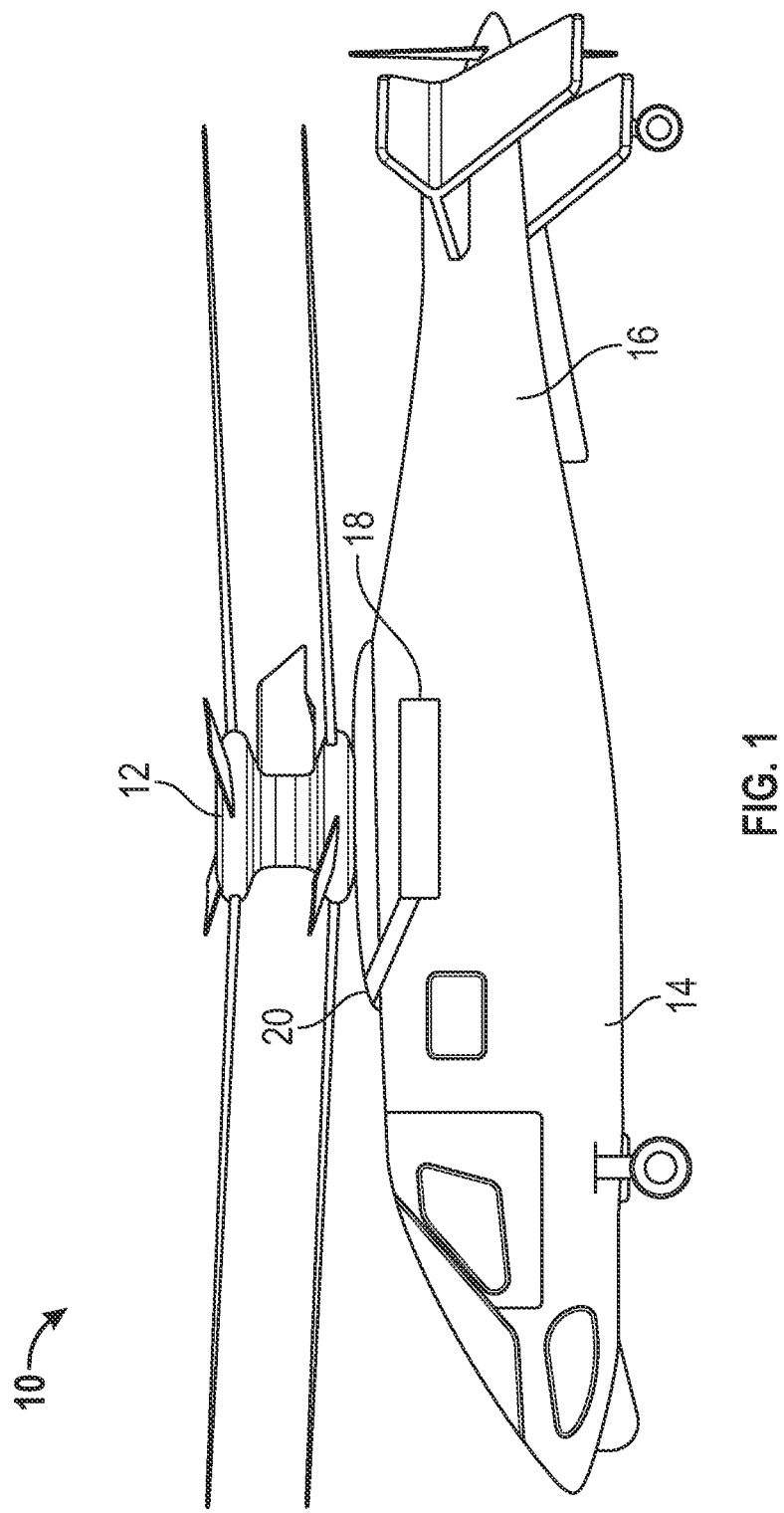
FIG. 1 is a schematic side view of an embodiment of a helicopter.
Figure 2:
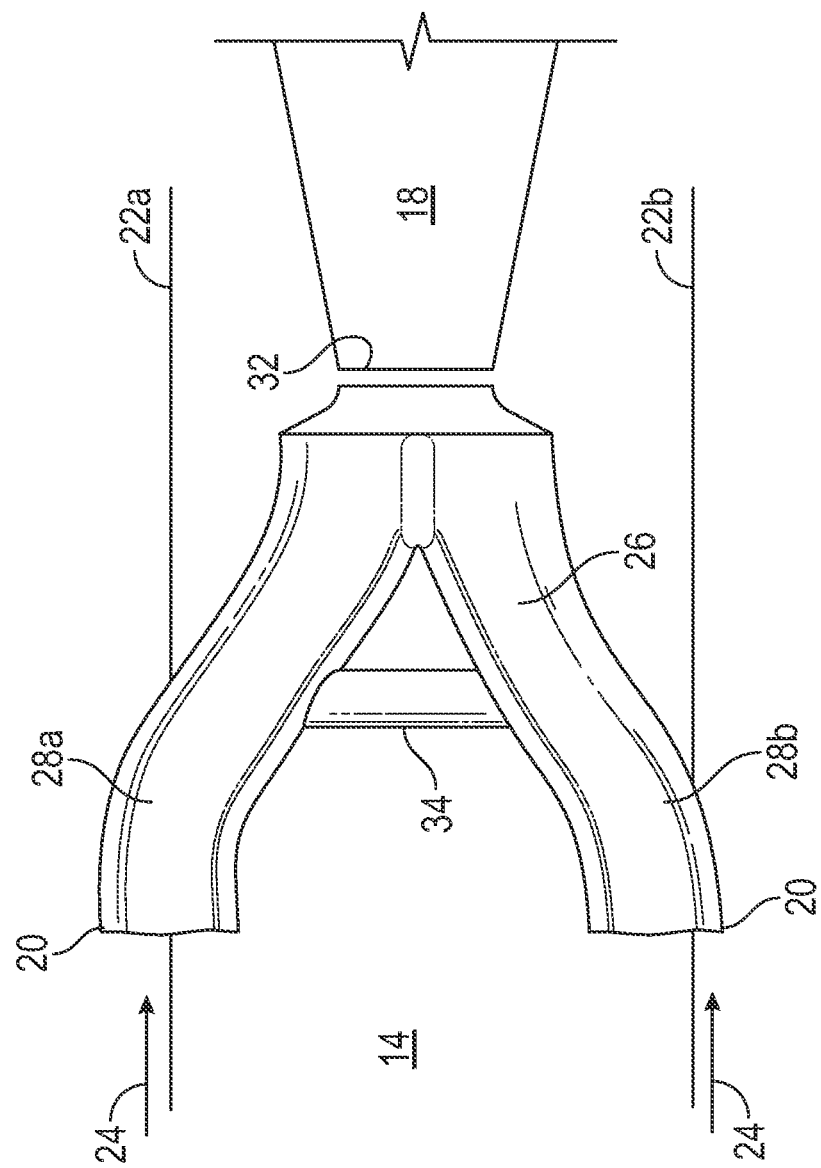
FIG. 2 is a schematic plan view of an embodiment of a helicopter.

Shown in FIG. 1 is a schematic of a rotary wing aircraft, in this embodiment, a helicopter 10. While the description of the embodiments herein are applied to a helicopter 10, it is to be appreciated that other forms of aircraft including fixed wing and rotary wing aircraft would benefit from the disclosure herein. The helicopter 10 includes a main rotor assembly 12, and a fuselage 14 having an extending tail 16. An engine 18 to drive the main rotor assembly 12 is located in the fuselage 14, with substantially forward-facing inlet duct openings 20 located at each lateral side 22 of the fuselage 14, as best shown in FIG. 2. As shown in FIG. 2, the duct openings 20 in the fuselage 14 direct airflow 24 into a bifurcated inlet duct 26 having two duct legs 28. The duct legs 28 converge at an engine inlet 32 of the engine 18.

Figure 3:
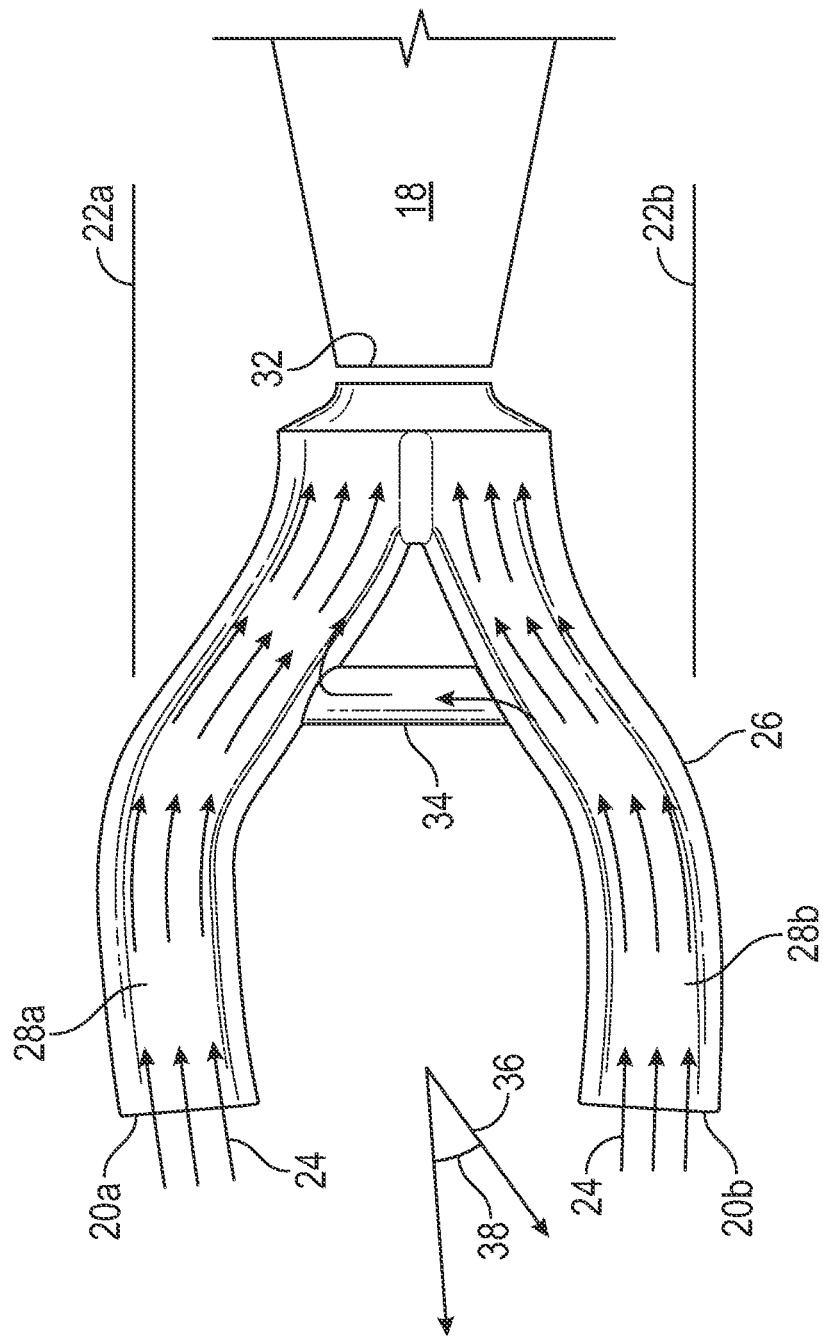
FIG. 3 is a schematic view of an embodiment of an engine inlet duct for an embodiment of a helicopter.

In some embodiments, as shown in FIG. 3, the inlet duct 26 includes a pressure relief pathway, a balance tube 34, extending between the two duct legs 28. The balance tube 34 is a hollow structure that may be of any suitable cross-section, for example, oval or circular, located upstream of the engine inlet 32. The balance tube 34 allows cross-flow between the duct legs 28 and is sized to provide a selected amount of flow between the duct legs 28. Allowing cross-flow between duct legs 28 is beneficial to release excess pressure to a first duct leg 28a from a second duct leg 28b to equalize a pressure distribution at the engine inlet 32 by equalizing a pressure between the two duct legs 28, thereby reducing inlet distortion effects at the engine inlet 32, for example, during forward flight yaw maneuvers of the helicopter 10.

In operation, when the helicopter 10 is, for example, engaged in forward flight as indicated by travel direction 36, it may perform maneuvers that result in yaw angles 38 relative to the travel direction 36. The maneuver results in an orientation of the helicopter 10 such that a first duct opening 20a is partially blocked by the fuselage 14 to incoming airflow 24, while a second duct opening 20b on an opposite side of the fuselage 14 is freely exposed to the incoming airflow 24. In a typical aircraft, this results in an imbalance in the airflow entering the two duct openings 20a and 20b, and different pressures in the two duct legs 28. This imbalance can be so severe as to see air flow 24 exiting the partially blocked duct opening 20a. In helicopter 10, however, a portion of the airflow 24 into duct opening 20b and second duct leg 28b in excess of the airflow 24 into duct opening 20a is diverted through the balance tube 34 to the first duct leg 28a, corresponding to duct opening 20a. The airflow 24 pressure at the two duct legs 28a and 28b is thus equalized downstream of the balance tube 34 and at the engine inlet 32 and allowing a similar massflow into the partially blocked duct opening 20a that may have had reverse flow without the balance tube 34, as the massflow in the unblocked duct opening 20b.

Figure 5:
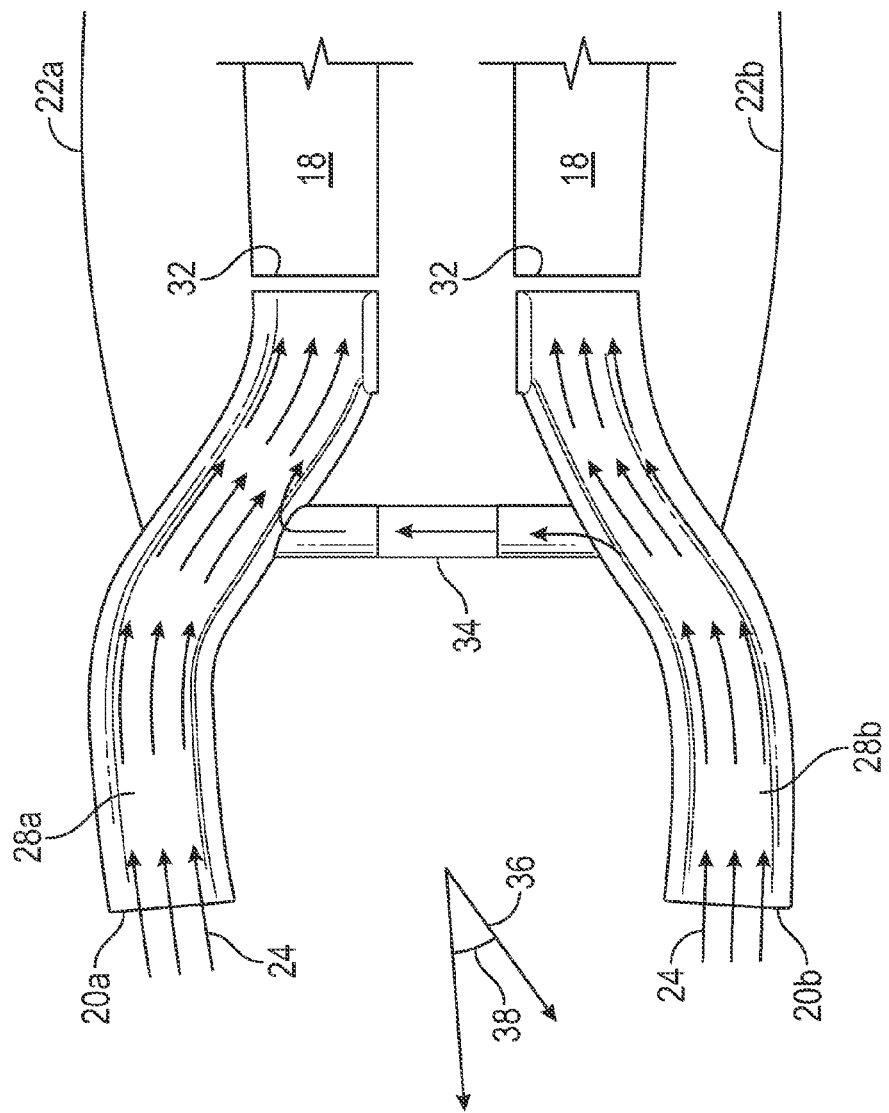
FIG. 5 is a schematic view of yet another embodiment of an engine inlet duct for an embodiment of a helicopter.

In other embodiments, as shown in FIG. 5, the arrangements described herein may be utilized in aircraft having two engines 18, with each duct leg 28 directing flow to one of the engines 18. As shown, the balance tube 34 directs excess airflow 24 from the second duct leg 28b to the first duct leg 28a, thus balancing inlet flow to the two engines 18.

Figure 4:
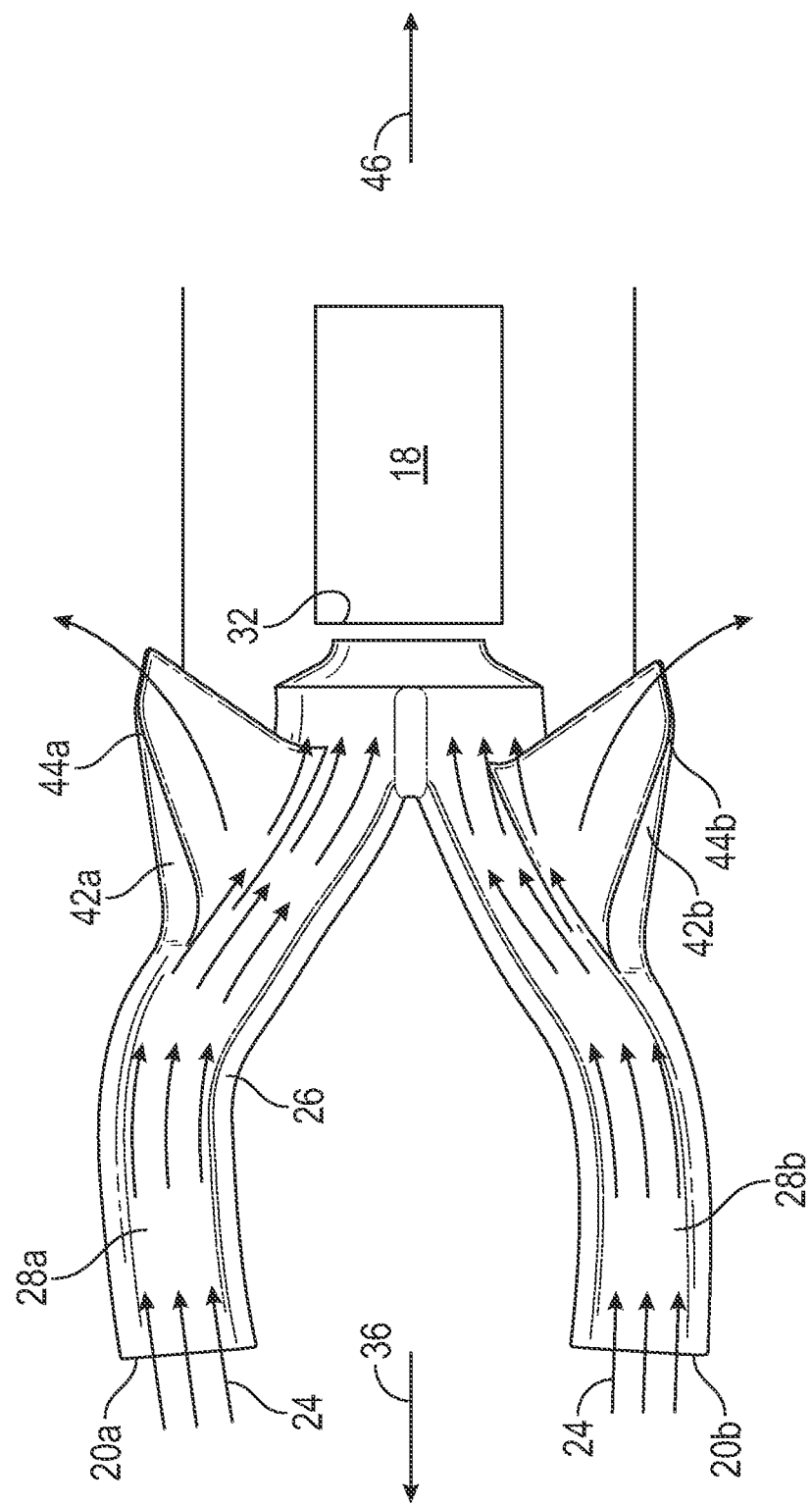
FIG. 4 is a schematic view of another embodiment of an engine inlet duct for an embodiment of a helicopter.

In another embodiment as shown in FIG. 4, the inlet duct 26 includes a bypass leg 42 extending from the two duct legs 28. Each bypass leg 42 has a bypass opening 44 in the fuselage 14 at an end of the bypass leg 42. In some embodiments, the bypass legs 42 extend in a substantially opposite direction from the duct legs 26, in a substantially rearward direction relative to the helicopter 10. The bypass openings 44 allow for releasing of excess airflow 24 in the duct legs 26 via the bypass legs 42 and bypass openings 44, such as excess airflow 24 resulting from a massflow higher than the engine 18 can consume caused by flight speed. In operation, when the helicopter 10 is traveling at speeds sufficient to supply a higher massflow than the engine 18 consumes, the excess airflow 24 through duct opening 20a and duct leg 28a is vented through bypass leg 42a and exits from bypass opening 44a. Similarly, excess airflow 24 into duct leg 28b is vented through bypass leg 42b and exits from bypass opening 44b. The airflow 24 that would have resulted in spillage, and the inherent associated drag penalty, is thus allowed to remain at a higher velocity with reduced drag. The excess airflow 24 also creates a lower velocity flow at the inlet opening 20 thereby significantly and adversely affecting the boundary layer and degrading inlet performance, a negative impact that is corrected via the venting of the excess airflow 24 through bypass legs 42 and bypass openings 44. The flow at the engine inlet 32 is stabilized at a higher velocity and reduced drag.

The bypass legs 42 are further beneficial during rearward flight of the helicopter 10 as inlets for airflow 24. Because of the rearward flight direction along a travel direction 46, airflow 24 enters the bypass openings 44 and flows along the bypass ducts 42 to the engine inlet 32. At the engine inlet 32, the airflow 24 enters the engine 18. In the case of a pressure surge, pressure may be vented through the bypass openings 44 via the bypass ducts 42. This is particularly useful for dissipating overpressurizations such as hammershock.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An inlet duct for an engine comprising:
   two or more inlet duct legs directly coupled to one another and converging at a single duct outlet, the duct outlet directly coupled to an engine inlet of a single engine; and
   a flow relief pathway disposed at each inlet duct leg, the flow relief pathway being arranged upstream of the duct outlet to condition an inlet airflow from the inlet duct legs at the engine inlet for substantially axial flow of the inlet airflow into the engine inlet.

2. The inlet duct of claim 1, wherein the flow relief pathway equalizes an inlet airflow pressure distribution upstream of the engine inlet.

3. The inlet duct of claim 1, wherein the flow relief pathway comprises a balance tube extending from a first inlet duct leg to a second inlet duct leg.

4. The inlet duct of claim 3, wherein the balance tube has a substantially circular cross-section.

5. An inlet duct for an engine comprising:
   two or more inlet duct legs directly coupled to one another and converging at a single duct outlet, the duct outlet directly coupled to an engine inlet of a single engine for substantially axial flow of an inlet airflow into the engine inlet; and
   a bypass leg extending from an inlet duct leg of the two or more inlet duct legs through a bypass opening, the bypass leg extending from the inlet duct leg upstream of the engine inlet.

6. The inlet duct of claim 5, wherein the bypass leg extends in a substantially opposite direction as the inlet duct leg.

7. The inlet duct of claim 5, wherein the bypass leg is configured as a flow inlet under selected conditions.

8. An aircraft comprising:
   a fuselage;
   an engine disposed in the fuselage;
   two or more duct openings in the fuselage; and
   an inlet duct extending from the two or more duct openings to the engine including:
      two or more inlet duct legs directly coupled to one another and converging at a single duct outlet, the duct outlet directly coupled to an engine inlet; and
      a flow relief pathway disposed at each inlet duct leg, the flow relief pathway being arranged upstream of the engine inlet to equalize a pressure distribution of an inlet flow from the inlet duct legs at the engine inlet for substantially axial flow of the inlet airflow into the engine inlet.

9. The aircraft of claim 8, wherein a first duct opening of the two or more duct openings is disposed at a first lateral side of the fuselage and a second duct opening of the two or more duct openings is disposed at a second lateral side of the fuselage opposite the first lateral side.

10. The aircraft of claim 8, wherein the two or more converging duct legs converge at an engine inlet opening.

11. The aircraft of claim 8, wherein the flow relief pathway comprises a balance tube extending from a first inlet duct leg to a second inlet duct leg.

12. The aircraft of claim 11, wherein the balance tube has a substantially circular cross-section.

13. An aircraft comprising:
    a fuselage;
    an engine disposed in the fuselage;
    one or more duct openings in the fuselage; and
    an inlet duct extending from the one or more duct openings to the engine including:

two or more inlet duct legs directly coupled to one another and converging at a single duct outlet, the duct outlet directly coupled to an engine inlet of a single engine for substantially axial flow of an inlet airflow into the engine inlet; and a bypass leg extending from an inlet duct leg of the two or more inlet duct legs through a bypass opening, the bypass leg extending from the inlet duct leg upstream of the engine inlet.

14. The aircraft of claim 13, wherein the bypass leg extends in a substantially opposite direction as the inlet duct leg.

15. The aircraft of claim 13, wherein the bypass leg is configured as a flow inlet under selected conditions.

16. The aircraft of claim 14, wherein the selected conditions include rearward flight.

17. A method of operating an aircraft comprising:

urging an inlet airflow into two or more duct openings disposed at a fuselage of the aircraft;

urging the inlet airflow through two or more inlet duct legs directly coupled to one another and extending from the two or more duct openings converging at a single duct outlet, the duct outlet directly coupled to an engine inlet of a single engine; and flowing a portion of the inlet airflow from at least one inlet duct leg of the two or more inlet duct legs into a flow relief pathway arranged upstream from the engine inlet for substantially axial flow of the inlet airflow into the engine inlet.

18. The method of claim 17, wherein flowing a portion of the inlet airflow into a flow relief pathway comprises:

flowing a portion of the inlet airflow from a first inlet duct leg through a balance tube connecting the first inlet duct leg and a second inlet duct leg; and flowing the portion of the inlet airflow into the second inlet duct leg.

19. A method of operating an aircraft comprising:

urging an inlet airflow into two or more duct openings disposed at a fuselage of the aircraft;

urging the inlet airflow through two or more inlet duct legs directly coupled to one another and extending from the two or more duct openings converging at a single duct outlet, the duct outlet being directly coupled to an engine inlet of a single engine for substantially axial flow of the inlet airflow into the engine inlet;

flowing a portion of the inlet airflow from a first inlet duct leg through a bypass leg extending from one or more inlet duct legs, the bypass leg extending from the one or more inlet duct legs upstream of the engine inlet; and flowing the portion of inlet airflow through a bypass opening in the fuselage.

20. The method of claim 19, further comprising flowing the inlet airflow into an engine inlet.

\* \* \* \* \*